US012608208B2

(12) United States Patent
Patel et al.

(10) Patent No.: US 12,608,208 B2
(45) Date of Patent: Apr. 21, 2026

(54) ASYNCHRONOUS RELEASE OPERATIONS IN A MULTIPROCESSOR SYSTEM

(71) Applicant: NVIDIA CORPORATION, Santa Clara, CA (US)

(72) Inventors: Manan Patel, San Jose, CA (US); Ivan Tanasic, San Francisco, CA (US); Daniel Marcovitch, Yokneam (IL); Michael Allen Parker, San Jose, CA (US); Srinivas Santosh Kumar Madugula, Visakhapatnam (IN); Raghuram L, Bangalore (IN); Wishwesh Anil Gandhi, Sunnyvale, CA (US); Olivier Giroux, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 10 days.

(21) Appl. No.: 18/593,817

(22) Filed: Mar. 1, 2024

(65) Prior Publication Data
US 2025/0278273 A1 Sep. 4, 2025

(51) Int. Cl.
*G06F 9/30* (2018.01)

(52) U.S. Cl.
CPC ........ *G06F 9/30087* (2013.01); *G06F 9/3009* (2013.01)

(58) Field of Classification Search
CPC .. G06F 9/30087; G06F 9/3009; G06F 9/3834; G06F 9/3004; G06F 9/522
See application file for complete search history.

(56) References Cited

U.S. PATENT DOCUMENTS

| | | | | |
|---|---|---|---|---|
| 6,088,771 A * | 7/2000 | Steely, Jr. | .............. | G06F 8/458 |
| | | | | 712/225 |
| 6,609,192 B1 * | 8/2003 | Guthrie | .............. | G06F 9/30087 |
| | | | | 712/30 |
| 6,625,660 B1 * | 9/2003 | Guthrie | ................ | G06F 9/3842 |
| | | | | 712/216 |
| 6,725,340 B1 * | 4/2004 | Guthrie | .............. | G06F 9/30087 |
| | | | | 712/216 |
| 6,963,967 B1 * | 11/2005 | Guthrie | ................ | G06F 9/3861 |
| | | | | 712/225 |

(Continued)

*Primary Examiner* — Keith E Vicary
(74) *Attorney, Agent, or Firm* — Squire Patton Boggs LLP; Sarah Mirza

(57) ABSTRACT

Various embodiments include techniques for performing memory synchronization operations between processors in a multiprocessor computing system. A first processor transfers data by issuing memory operations to store the data to a shared memory. The first processor issues an asynchronous release operation to a load store unit. In response, the load store unit issues a memory synchronization operation to ensure that the data associated with the memory operations is visible in the shared memory. While the asynchronous release operation is pending, the first processor is able to issue further instructions and perform other operations. When the data associated with the memory operations is visible in the shared memory, the memory synchronization operation completes and the load store unit writes a flag to a separate memory location. Upon detecting that the flag has been written, a second thread, and/or other threads, can reliably read the data stored in the shared memory.

20 Claims, 7 Drawing Sheets

(56) References Cited

U.S. PATENT DOCUMENTS

| | | | |
|---|---|---|---|
| 2009/0198917 A1* | 8/2009 | Arimilli | G06F 9/30087 |
| | | | 711/E12.001 |
| 2009/0198963 A1* | 8/2009 | Arimilli | G06F 9/3834 |
| | | | 712/205 |
| 2011/0078692 A1* | 3/2011 | Nickolls | G06F 9/30087 |
| | | | 718/103 |
| 2012/0198214 A1* | 8/2012 | Gadre | G06F 9/30087 |
| | | | 712/225 |
| 2013/0262775 A1* | 10/2013 | Asaro | G06F 12/0877 |
| | | | 711/135 |
| 2015/0286570 A1* | 10/2015 | Guthrie | G06F 12/128 |
| | | | 711/122 |
| 2017/0315922 A1* | 11/2017 | Guthrie | G06F 9/3004 |
| 2023/0021678 A1* | 1/2023 | Parker | G06F 9/30087 |
| 2024/0069736 A1* | 2/2024 | Madugula | G06F 3/0611 |

* cited by examiner

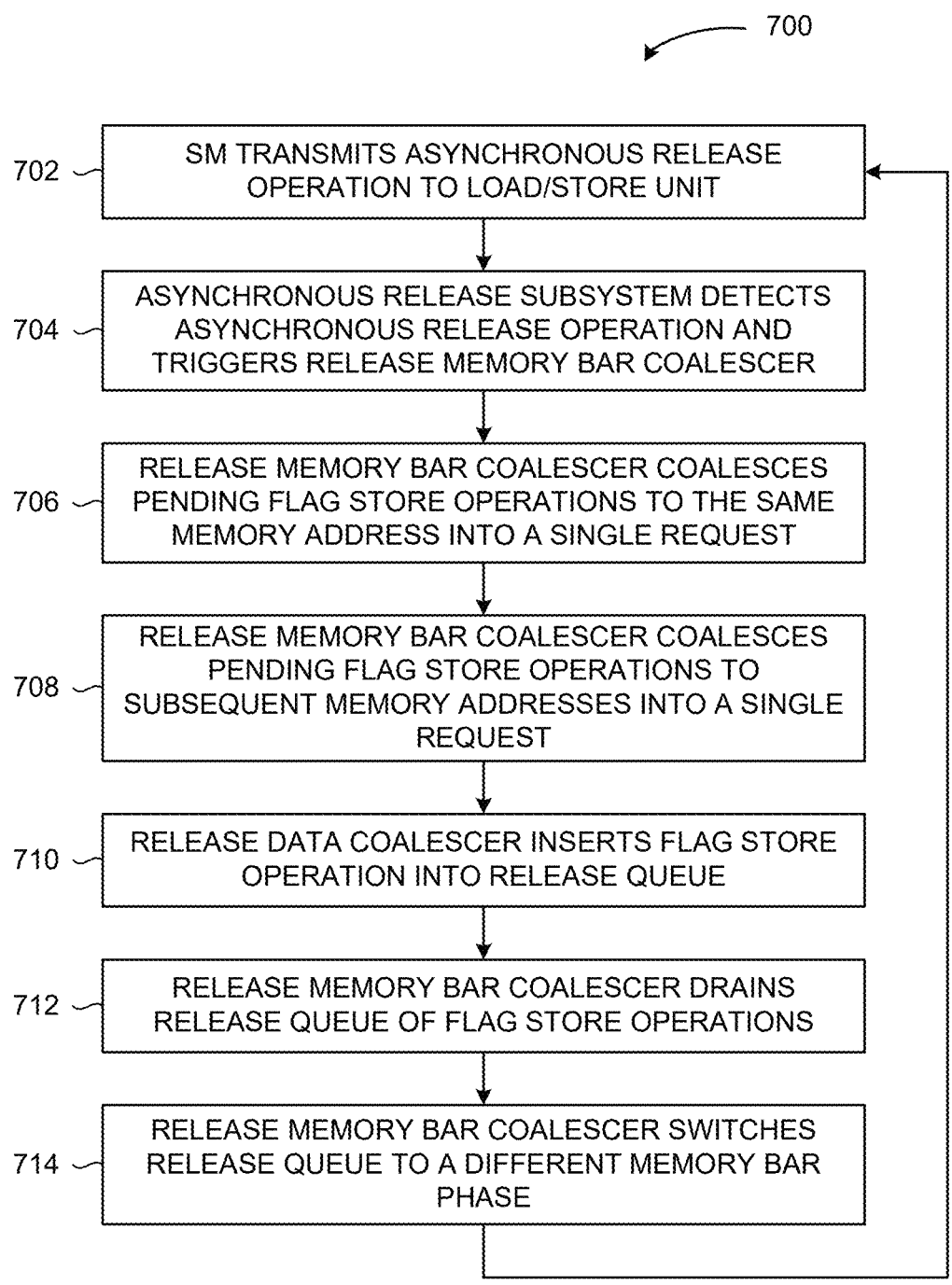

700

| 702 | SM TRANSMITS ASYNCHRONOUS RELEASE OPERATION TO LOAD/STORE UNIT |

| 704 | ASYNCHRONOUS RELEASE SUBSYSTEM DETECTS ASYNCHRONOUS RELEASE OPERATION AND TRIGGERS RELEASE MEMORY BAR COALESCER |

| 706 | RELEASE MEMORY BAR COALESCER COALESCES PENDING FLAG STORE OPERATIONS TO THE SAME MEMORY ADDRESS INTO A SINGLE REQUEST |

| 708 | RELEASE MEMORY BAR COALESCER COALESCES PENDING FLAG STORE OPERATIONS TO SUBSEQUENT MEMORY ADDRESSES INTO A SINGLE REQUEST |

| 710 | RELEASE DATA COALESCER INSERTS FLAG STORE OPERATION INTO RELEASE QUEUE |

| 712 | RELEASE MEMORY BAR COALESCER DRAINS RELEASE QUEUE OF FLAG STORE OPERATIONS |

| 714 | RELEASE MEMORY BAR COALESCER SWITCHES RELEASE QUEUE TO A DIFFERENT MEMORY BAR PHASE |

FIG. 7

ASYNCHRONOUS RELEASE OPERATIONS IN A MULTIPROCESSOR SYSTEM

BACKGROUND

Field of the Various Embodiments

Various embodiments relate generally to computing system architectures and, more specifically, to asynchronous release operations in a multiprocessor system.

Description of the Related Art

A computing system generally includes, among other things, one or more processing units, such as central processing units (CPUs) and/or graphics processing units (GPUs), and one or more memory systems. Processing units execute user mode software applications, which submit and launch compute tasks, executing on one or more compute engines included in the processing units. In operation, processing units load data from the one or more devices, perform various arithmetic and logical operations on the data, and store data back to the one or devices. The one or more devices can be memory devices of one or more memory systems and/or one or more peripheral devices, such as a network interface card (NIC), a solid-state drive (SSD), and/or the like.

In a multiprocessor system, a CPU and/or a GPU can have multiple processing units. The different processing units of the CPU and/or GPU, or portions thereof, can execute different threads concurrently, where each thread is an instance of a program. Certain tasks involve transferring data between different threads executing on different processing units, between a processing unit and peripheral devices, and/or the like. For example, a first thread executing on a first processing unit (source) can transfer a block of data to a second thread executing on a second processing unit (destination) by storing the block of data to a memory system accessible to the second processing unit. More specifically, the first thread transfers the block of data to the second thread by issuing a series of memory operations, where each memory operation stores a portion of the data included in the data block. When all of the data in the data block is visible to the second thread, the second thread can access the data to perform further operations.

In many cases, the CPU and/or GPU can be a relaxed memory model processing unit, where thread instructions can execute out of order. Consequently, when a thread executes, for example, ten sequential memory operations, the tenth memory operation can complete while one or more of the first nine memory operations is still outstanding. Therefore, after issuing the series of memory operations, the first thread issues a memory synchronization operation, such as a memory fence or memory barrier. The first thread executes a flag store operation by writing a flag to a different memory location from where the data block is stored, by indivisibly incrementing a flag, and/or the like. The memory synchronization operation is a synchronization mechanism that ensures the series of memory operations is visible to all participating threads at a given scope, such as system scope or processing unit scope. The memory synchronization operation prevents the first thread from issuing further memory operations and transmits a synchronization request to the memory system. The memory system flushes out memory operations issued prior to the memory synchronization operation. The first thread completes the memory synchronization operation in response to receiving an acknowledgment that the prior memory operations have been flushed.

After the first thread completes the memory synchronization instruction, all of the data in the data block is visible to the second thread, and the first thread can again issue memory operations. The first thread executes the flag store operation to indicate that the data in the data block is ready for consumption by the second thread. Meanwhile, the second thread executes a series of polling operations to determine if the first thread has written the flag. Alternatively, the flag store operation can trigger a destination operation, such as peripheral device doorbells, PowerPC lightweight interrupts, and so on, such that the flag store operation is event driven rather than part of a polling based operation. When the first thread executes the flag store operation, the next polling operation is successful, and the second thread detects that the flag has been written. The second thread can then proceed with consuming the data stored in the data block. If the second thread consumes the data before detecting the flag store, then one or more of the memory operations can be in process, and the second thread can read incorrect data from the data block.

One problem with this technique for transferring data between threads is that the first thread stalls after issuing the memory synchronization operation and remains stalled until the memory synchronization operation completes. In some examples, additional threads that are included in the same thread group as the first thread also stall until the memory synchronization operation completes. As a result, the first thread, and possibly other threads in the same thread group, cannot execute additional instructions or complete additional work while the memory synchronization operation is pending. These stalls can negatively impact memory traffic patterns throughout the computing system, thereby reducing overall performance of various processing units in the computing system. Further, the memory synchronization operation can take a significant amount of time to complete. The amount of time can be particularly long when the pending memory operations are directed towards memory locations that are remotely located with respect to the first processing unit that is executing the first thread. As a result, the performance of the first thread can suffer and the throughput of the first processing unit can decrease when using memory synchronization operations.

As the foregoing illustrates, what is needed in the art are more effective techniques for synchronizing data between threads executing in a multiprocessor computing system.

SUMMARY

Various embodiments of the present disclosure set forth a computer-implemented method for transferring data between threads executing in a multiprocessor computing system. The method includes receiving a first store operation from a first processing unit that includes a first memory synchronization operation and a first flag store operation. The method further includes storing a first entry corresponding to the first flag store operation in a queue. The first flag store operation, when executed, indicates that data associated with a second store operation generated by the first processing unit prior to the first store operation is visible in a memory. The first processing unit continues to execute one or more load operations or store operations while the first memory synchronization operation is pending.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, a thread that issues an asynchronous release operation does not stall pending completion of a memory synchronization operation. Instead, after issuing the asynchronous release operation, the thread can execute further operations without waiting for data associated with the asynchronous release operation to be visible to the receiving thread(s). As a result, the issuing thread executes with increased performance relative to prior techniques. Further, because multiple asynchronous release operations can be coalesced to a single memory synchronization operation, fewer asynchronous release operations are issued, further improving performance. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 7 is a flow diagram of method steps for performing asynchronous release operations with the streaming multiprocessors of FIG. 4, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
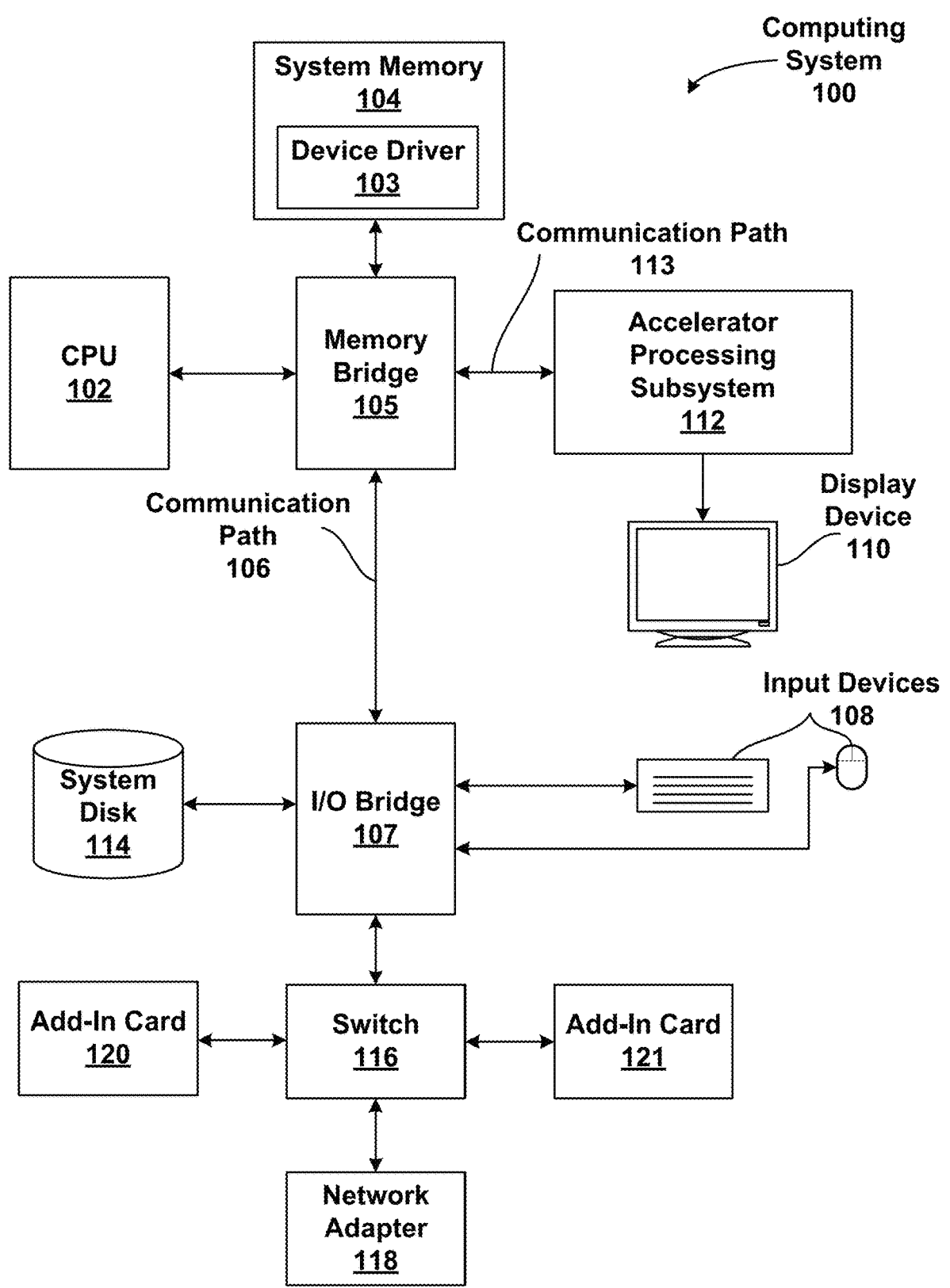
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an auxiliary processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and auxiliary processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, auxiliary processing subsystem 112 comprises a graphics subsystem that delivers pixels to a display device 110 that may be any conventional cathode ray tube, liquid crystal display, light-emitting diode display, or the like. In such embodiments, the auxiliary processing subsystem 112 incorporates circuitry optimized for graphics and video processing, including, for example, video output circuitry. As described in greater detail below in FIG. 2, such circuitry may be incorporated across one or more auxiliary processors included within auxiliary processing subsystem 112. An auxiliary processor includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NPU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, the auxiliary processing subsystem 112 incorporates circuitry optimized for general purpose and/or compute processing. Such circuitry may be incorporated across one or more auxiliary processors included within auxiliary processing subsystem 112 that are configured to perform such general purpose and/or compute operations. In yet other embodiments, the one or more auxiliary processors included within auxiliary processing subsystem 112 may be configured to perform graphics processing, general purpose processing, and compute processing operations. System memory 104 includes at least one device driver 103 configured to manage the processing operations of the one or more auxiliary processors within auxiliary processing subsystem 112.

In various embodiments, auxiliary processing subsystem 112 may be integrated with one or more other the other elements of FIG. 1 to form a single system. For example, auxiliary processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of auxiliary processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, auxiliary processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
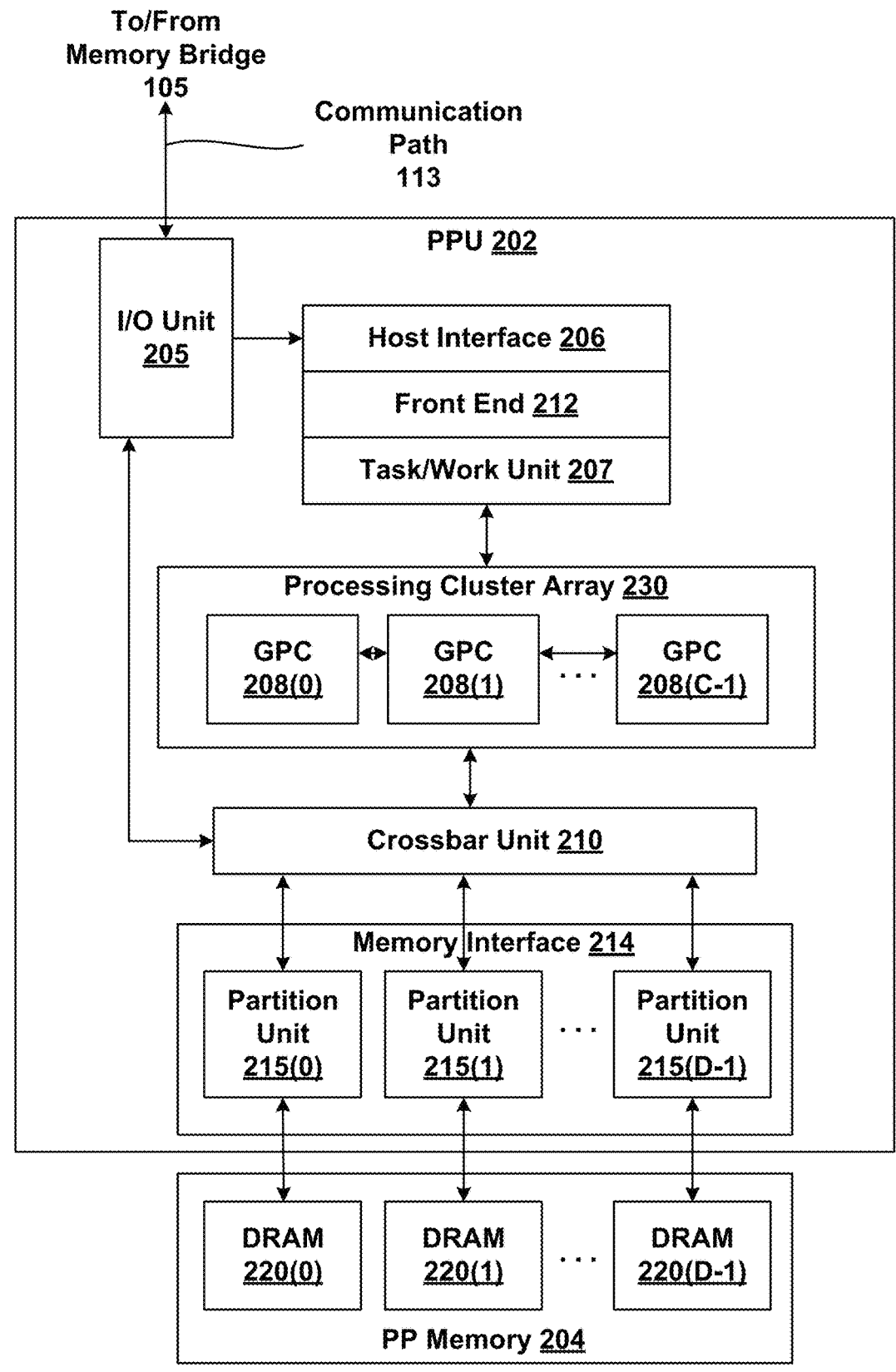
FIG. 2 is a block diagram of a parallel processing unit (PPU) included in the auxiliary processing subsystem of FIG. 1, according to various embodiments.

FIG. 2 is a block diagram of a parallel processing unit (PPU) 202 included in the auxiliary processing subsystem 112 of FIG. 1, according to various embodiments. Although FIG. 2 depicts one PPU 202, as indicated above, auxiliary processing subsystem 112 may include any number of PPUs 202. Further, the PPU 202 of FIG. 2 is one example of an auxiliary processor included in auxiliary processing subsystem 112 of FIG. 1. Alternative auxiliary processors include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of auxiliary processor(s) included within auxiliary processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or auxiliary processors other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computing system 100 may be varied. In some embodiments, auxiliary processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within auxiliary processing subsystem 112, or another auxiliary processing subsystem 112 within computing system 100.

As noted above, any number of PPUs 202 may be included in an auxiliary processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
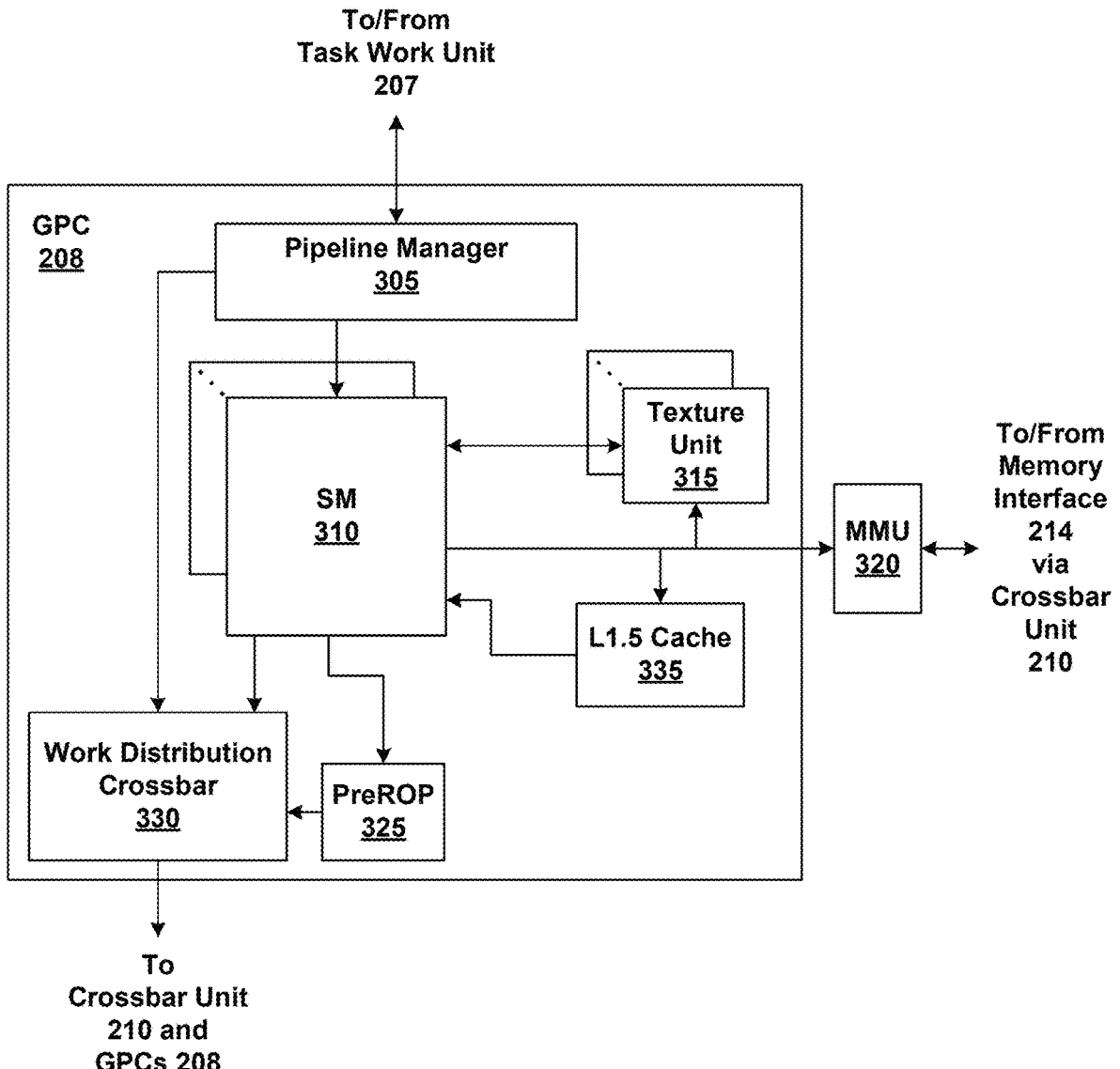
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Transferring Interthread Data via Asynchronous Release Operations

Various embodiments include techniques for synchronizing data between threads executing in a multiprocessor computing system. With the disclosed techniques a first thread transfers data to a second thread by writing the data to memory with a series of memory operations and executing an asynchronous release operation. The asynchronous release operation includes a store operation with a built-in memory synchronization operation, referred to herein as a flag store operation or a flag operation, that does not stall the issuing thread for the duration of the memory synchronization operation. In various embodiments, the flag store operation can be a standard memory write operation. Additionally or alternatively, the flag store operation can be an indivisible memory operation, such as an indivisible increment operation, an indivisible logical OR operation, and/or the like. A load store unit receives the asynchronous release operation and enqueues the flag store operation into a side structure, referred to herein as a release queue or, more simply, a queue, and allows the issuing thread to proceed with normal execution. Memory barrier logic executes the memory synchronization operation. When the memory synchronization operation completes, the memory barrier logic signals the completion of the memory synchronization operation to the release queue. At this point, the earlier memory operations are visible to the receiving thread, and the release queue can perform the flag store operation.

In some examples, the release queue can store multiple asynchronous release operations, where each asynchronous release operation is waiting for the relevant earlier memory operations to become visible. When coupled with a synchronization unit that is capable of coalescing, or combining, multiple memory synchronization operations, a single memory synchronization operation is sufficient to satisfy the visibility requirement of multiple pending asynchronous release operations that were coalesced. As a result, asynchronous release operations can further improve performance by minimizing the number of barrier operations transmitted to the memory subsystem. In some examples, the store operations, memory synchronization operations, and/or flag store operations described herein can be issued via processor instructions executed by a processing unit.

Figure 4:
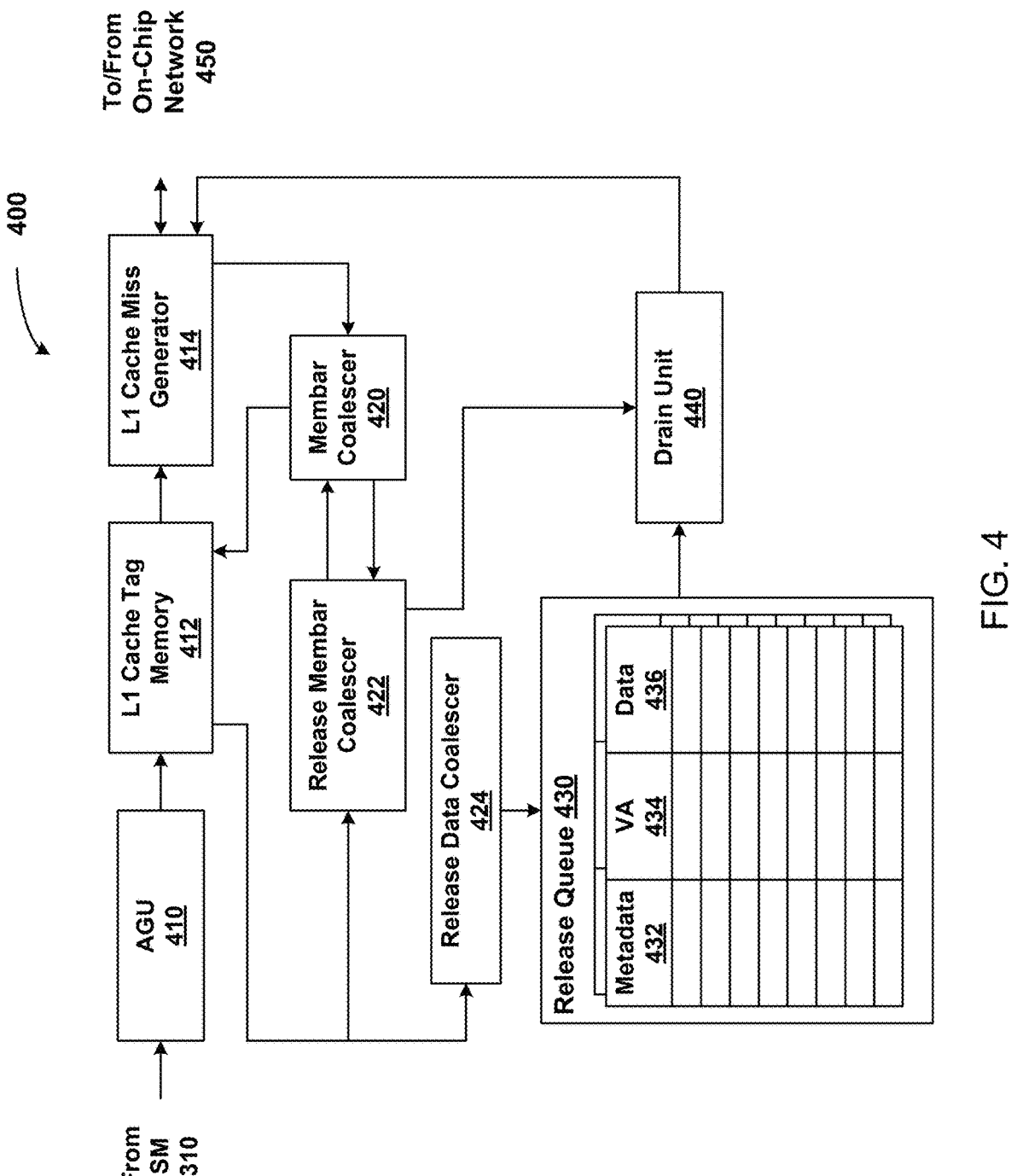
FIG. 4 is a block diagram of an asynchronous release subsystem to process memory synchronization operations for the streaming multiprocessors included in the GPC of FIG. 3, according to various embodiments.

FIG. 4 is a block diagram of an asynchronous release subsystem 400 to process memory synchronization operations for the streaming multiprocessors 310 included in the GPC 208 of FIG. 3, according to various embodiments. Asynchronous release subsystem 400 is also referred to herein as a memory synchronization subsystem. The asynchronous release subsystem 400 can be included within the GPC 208, external to the GPC 208, or partially internal and partially external to the GPC 208. As shown, the asynchronous release subsystem 400 includes, without limitation, an address generation unit (AGU) 410, a level 1 (L1) cache tag memory 412, an L1 cache miss generator 414, a memory bar (membar) coalescer 420, a release memory bar coalescer 422, a release data coalescer 424, a release queue 430, and a drain unit 440. The address generation unit 410, L1 cache tag memory 412, and L1 cache miss generator 414 are at least a subset of the pipeline stages of a specialized processing unit referred to as a load store unit (not explicitly shown in FIG. 4). More generally, the components shown in FIG. 4 illustrate portions of the load store unit that implement the asynchronous release operations disclosed herein. The load store unit is coupled to one or more memory subsystems via an interconnect. In some embodiments, such a memory subsystem can include one or more crossbar units, such as crossbar unit 210, an MMU 320, an L2 cache memory, a frame buffer, a memory controller, arbiters and/or the like. The memory subsystem routes and processes received memory requests until the memory requests reach a final destination, such as system memory 104, PP memory, a network interface card (NIC), and/or the like.

In operation, the address generation unit 410 receives store operations from a corresponding SM. In some embodiments, one address generation unit 410 is included in each SM 310 and/or in each load store unit. A store operation can be a standard store instruction, a reduction instruction, an indivisible read-modify write (RMW) instruction, and/or the like. The address generation unit 410 is a virtual address generation and checking unit. The address generation unit 410 receives takes a set of inputs from one or more threads executing on an SM 310. These inputs can include data from different registers, immediate values from executed instructions, state variables, and/or the like. The address generation unit 410 processes those inputs, such as by addition, multiplication, and/or the like, to generate an address. Further, the address generation unit 410 performs misalignment tests, error checks, and/or the like. The address generation unit 410 can also detect whether a computed address is within the memory range of various apertures, such as shared memory aperture, a global memory aperture, a local memory aperture, and/or the like. During synchronization operations, a memory synchronization operation can pass through the address generation unit 410, while the store operation for the corresponding release operation includes an address that is processed by the address generation unit 410. The address generation unit 410 transmits the store operation with the generated memory address to the L1 cache tag memory 412.

The L1 cache tag memory 412 determines whether the data for the generated memory address is stored in the L1 cache. If the L1 cache tag memory 412 includes a cache tag entry for the generated memory address, then the data accessed by the store operation is resident in L1 cache memory. If the L1 cache tag memory 412 does include a cache tag entry for the generated memory address, then the data accessed by the store operation is not resident in L1 cache memory. This latter case is referred to as an L1 cache miss. In such cases, the data included in the store operation is stored in a memory other than the L1 cache memory, such as L2 cache memory, local memory, system memory, local memory of another processing unit, and/or the like. In such cases, the L1 cache tag memory 412 detects the L1 cache miss and transmits the store operation to the L1 cache miss generator 414.

The L1 cache miss generator 414 receives the store operation from the L1 cache tag memory 412. In cases where L1 cache tag memory 412 detects an L1 cache miss, the L1 cache miss generator 414 generates a memory request to store the data in memory and to store the data in one or more cache lines of the L1 cache tag memory 412. The L1 cache tag memory 412 prepares the store operation to be stored in the address space identified by the L1 cache tag memory 412. The L1 cache miss generator 414 transmits the prepared store operation to the memory subsystem (not shown) via an on-chip network 450 and/or other suitable interface. The on-chip network 450 is an interconnect, bus, and/or other communications interface that connects SMs 310 to one another and to other on-chip components, such as L2 cache memory, local memory, system memory, local memory of another processing unit, and/or the like. In some embodiments, the on-chip network 450 communicates with the network adapter 118 to connect the computing system 100 with other computing systems in a larger computer network. In such embodiments, the destination for a flag store operation, and/or other store operation, can be the network adapter 118. More generally, a flag store operation that passes through the on-chip network 450 can be directed to any memory location in the computer system 100 and/or in a different computer system.

In addition to standard store operations, the address generation unit 410 can receive memory synchronization operations and/or store release operations from SMs 310. If the SM 310 transmits a memory synchronization operation to the address generation unit 410 and subsequently issues a load operation or a store operation, then the SM 310 stalls pending completion of the memory synchronization operation. If the address generation unit 410 receives a memory synchronization operation from the SM 310, then the address generation unit 410 and the L1 cache tag memory 412 process the memory synchronization operation by passing the memory synchronization operation through until the memory synchronization operation reaches the memory bar coalescer 420. When the L1 cache miss generator 414 receives the memory synchronization operation from the L1 cache tag memory 412, the L1 cache tag memory 412 transmits the memory synchronization operation to the memory bar coalescer 420. The memory bar coalescer 420 coalesces the incoming memory bar operation with other memory bar operations that are received shortly before and/or shortly after the incoming memory bar operation.

In some examples, to perform these coalescing operations, the memory bar coalescer 420 initializes a counter to a first predefined value. The memory bar coalescer 420 periodically increments or decrements the counter to a second predefined value, where the difference between the first predefined value and the second predefined value represents a duration of time. In some examples, the memory bar coalescer 420 can initialize the counter to a maximum counter value and can decrement the counter until the counter reaches zero. In some examples, the memory bar coalescer 420 can initialize the counter to zero and can increment the counter until the counter reaches a maximum counter value. The memory bar coalescer 420 coalesces memory synchronization operations while the counter is still counting and has not yet reached the second predefined value. When the counter reaches the second predefined value, coalescing of memory synchronization operations is complete. Other components of the memory subsystem external to the load store unit perform one or more additional portions of the memory synchronization operation. Subsequently, one or more of the other components of the memory subsystem transmit a signal to the load-store unit indicating that these additional portions of the memory synchronization operation are complete. When the memory synchronization operation is complete, the memory subsystem un-stalls the pipeline in the load store unit, thereby allowing the AGU 410 to receive the next memory request. This memory request can be a flag store operation generated by the corresponding SM 310. The load store unit processes the flag store operation as a standard store instruction received from the SM 310. For example, the flag store operation proceeds through the AGU 410, L1 cache tag memory 412, L1 cache miss generator 414, and on-chip network 450, as described herein.

If the SM 310 transmits a store release operation to the address generation unit 410, the SM 310 does not stall, while the store release operation is pending, even if the SM 310 subsequently issues a load operation or a store operation. The store release operation includes a store operation, such as a standard store instruction, a reduction instruction, an indivisible read-modify write (RMW) instruction, and/or the like. The store release operation further includes an embedded memory bar operation and a flag store operation that does not stall the issuing SM thread group 610. If the address generation unit 410 receives a store release operation from the SM 310, then the address generation unit 410 processes the store release operation similarly to a standard store operation. When the L1 cache tag memory 412 receives the store release operation from the address generation unit 410, the L1 cache tag memory 412 splits the store release operation into a memory bar operation and a flag store operation. The L1 cache tag memory 412 transmits the memory bar operation to the release memory bar coalescer 422 and transmits the flag store operation to the release data coalescer 424.

The release memory bar coalescer 422 and release data coalescer 424 coalesce the incoming store release operation with other store release operations that are received shortly before and/or shortly after the incoming store release operation. In some examples, the release data coalescer 424 coalesces pending flag store operations to the same memory address into a single flag store operation. In so doing, the release data coalescer 424 attempts to identify other pending flag store operations to the same memory address and to coalesce these flag store operations to the same memory address into a single flag store operation. Additionally or alternatively, the release data coalescer 424 coalesces pending flag store operations to adjacent (e.g., immediately subsequent and/or immediately previous) memory addresses into a single request. In so doing, the release data coalescer 424 attempts to identify other pending flag store operations to adjacent memory addresses and to coalesce these flag store operations to a single flag store operation representing a larger data block than each of the original flag store operations.

In some examples, to perform the coalescing operations, the release memory bar coalescer 422 initializes a counter to a first predefined value. The release memory bar coalescer 422 periodically increments or decrements the counter to a second predefined value, where the difference between the first predefined value and the second predefined value represents a duration of time. In some examples, the release memory bar coalescer 422 can initialize the counter to a maximum counter value and can decrement the counter until the counter reaches zero. In some examples, the release memory bar coalescer 422 can initialize the counter to zero and can increment the counter until the counter reaches a maximum counter value. The release memory bar coalescer 422 coalesces membar operations while the counter is still counting and has not yet reached the second predefined value. When the counter reaches the second predefined value, the release memory bar coalescer 422 ceases to coalesce membar operations and forwards the membar operations to the main memory bar coalescer 420.

Meanwhile, the release data coalescer 424 coalesces the data associated with the store release operations that are being coalesced by the release memory bar coalescer. If a particular store release operation is not coalesced with any other release store operation, then the release data coalescer 424 generates metadata 432, a virtual address 434, and/or data 436 associated with the flag store operation that releases the store release operation. The release data coalescer 424 generates the metadata 432, virtual address 434, and data 436 based on the data included in the original store release operation, the generated address from the address generation unit 410, and/or the like. The release data coalescer 424 stores the metadata 432, virtual address 434, and data 436 for the flag store operation in an entry of the release queue 430.

If the release data coalescer 424 determines that the incoming store release operation is directed to the same memory address as another store release operation, then the release data coalescer 424 can coalesce the two corresponding flag store operations. The release data coalescer 424 generates metadata 432, a virtual address 434, and data 436 for the flag store operation that releases the two store release operations. The release data coalescer 424 generates the metadata 432, virtual address 434, and data 436 based on the data included in both of the store release operations, the generated addresses from the address generation unit 410, and/or the like. The release data coalescer 424 stores the metadata 432, virtual address 434, and data 436 for the two flag store operations in a single entry of the release queue 430. In some embodiments, the release data coalescer 424 coalesces such pending flag store operations by replacing a first entry in release queue 430 with a second entry.

If the release data coalescer 424 determines that the incoming store release operation is directed to an adjacent memory address as another store release operation, then the release data coalescer 424 can coalesce the two corresponding flag store operations into a single flag release operation that covers the combined memory address range of the two store release operations. The release data coalescer 424 generates metadata 432, a virtual address 434, and data 436 for the flag store operation that releases the two store release operations. The release data coalescer 424 generates the metadata 432, virtual address 434, and data 436 based on the data included in both of the store release operations, the generated addresses from the address generation unit 410, and/or the like. The release data coalescer 424 stores the metadata 432, virtual address 434, and data 436 for the two flag store operations in a single entry of the release queue 430. In some embodiments, the release data coalescer 424 coalesces such pending flag store operations by replacing a first entry in release queue 430, corresponding to a first portion of the combined memory address range, with a second entry corresponding to the first portion of the combined memory address range and a second portion of the combined memory address range. In some embodiments, the first portion of the combined memory address range can overlap with the second portion of the combined memory address range.

In some examples, to perform the coalescing operations, the release memory bar coalescer 422 initializes a counter to a first predefined value. The release memory bar coalescer 422 periodically increments or decrements the counter to a second predefined value, where the difference between the first predefined value and the second predefined value represents a duration of time. In some examples, the release memory bar coalescer 422 can initialize the counter to a maximum counter value and can decrement the counter until the counter reaches zero. In some examples, the release memory bar coalescer 422 can initialize the counter to zero and can increment the counter until the counter reaches a maximum counter value. The release memory bar coalescer 422 coalesces flag store operations while the counter is still counting and has not yet reached the second predefined value. When the counter reaches the second predefined value, the release memory bar coalescer 422 ceases to coalesce flag store operations and forwards the flag store operations to the main memory bar coalescer 420.

Subsequently, when one or more pending store release operations complete, the memory bar coalescer 420 receives a memory bar acknowledgment indicating that the data corresponding to the one or more pending store release operations is now visible in the relevant memory address spaces. The memory bar coalescer 420 transmits the memory bar acknowledgment to the release memory bar coalescer 422. In response, the release memory bar coalescer 422 transmits a signal to the drain unit 440 to indicate that the corresponding entries for the flag store operations can be processed, or drained, from the release queue.

The drain unit 440 begins to process the entries for the flag store operations in the release queue 430, thereby draining the release queue 430 of flag store operations. As each entry is drained from the release queue 430, the release memory bar coalescer 422 forwards the corresponding flag store operation to the L1 cache miss generator 414. The L1 cache miss generator 414, in turn, processes the flag store operations.

The release memory bar coalescer 422, the release data coalescer 424 and/or other components of the asynchronous release subsystem 400 switch the release queue 430 to a different memory bar phase. While the drain unit 440 is draining the current buffer of the release queue 430 of flag store operations, the release memory bar coalescer 422 continues to collect further flag store operations in one or more other background buffers of the release queue 430. Each buffer of the release queue 430 corresponds to a different memory bar phase of the release queue 430. When the current buffer, for the current memory bar phase, is drained of write store operations, the asynchronous release subsystem 400 switches the memory bar phase of the release queue 430 such that one of the background buffers becomes the current buffer, and the formerly current buffer becomes a background buffer. In the new memory bar phase, the release memory bar coalescer 422 drains the newly current buffer of flag store operations while the formerly current buffer collects further flag store operations for a subsequent memory bar phase of the release queue 430.

Due to the asynchronous nature of the asynchronous release operation mechanism, the issuing thread group executing on the SM 310 can generate a query operation directed to the asynchronous release subsystem 400 to determine the status of outstanding asynchronous release operations. In some examples, the issuing thread group executing on the SM 310 can perform such a query operation in order to synchronize the current stream of asynchronous release operations with a stream of subsequent memory synchronization operations (whether asynchronous or not) and to query the completion status of the asynchronous release operations. To do so, an existing instruction of the instruction set architecture (ISA) can be extended to implement the query operation. Alternatively, a new instruction can be added to the ISA to implement the query operation. When one or more threads in the issuing thread group executes the extended or new instruction, the thread group waits for flag store operations associated with the issuing thread group to complete and be flushed from the release queue 430 and for same address ordering to be stored. At that point, the load store unit transmits a status message to the issuing thread group on the SM 310 that generated the query operation. The status message indicates that the asynchronous release operation is complete. The issuing thread group can then use existing operations that guarantee the completion (i.e., visibility of data) of the flag store operations.

It will be appreciated that the system shown herein is illustrative and that variations and modifications are possible. The techniques described herein are in the context of one or more SMs 310 included in the GPC 208 of FIG. 3. Additionally or alternatively, the techniques described herein can be performed by one or more alternative processors including, without limitation, CPUs, GPUs, DMA units, IPUs, NPUs, TPUs, NNPs, DPUs, VPUs, ASICs, FPGAs, and/or the like, in any combination. More generally, the techniques described herein can be applied to any CPU 102, PPU 202, and/or any other processing unit in any combination.

Figure 5:
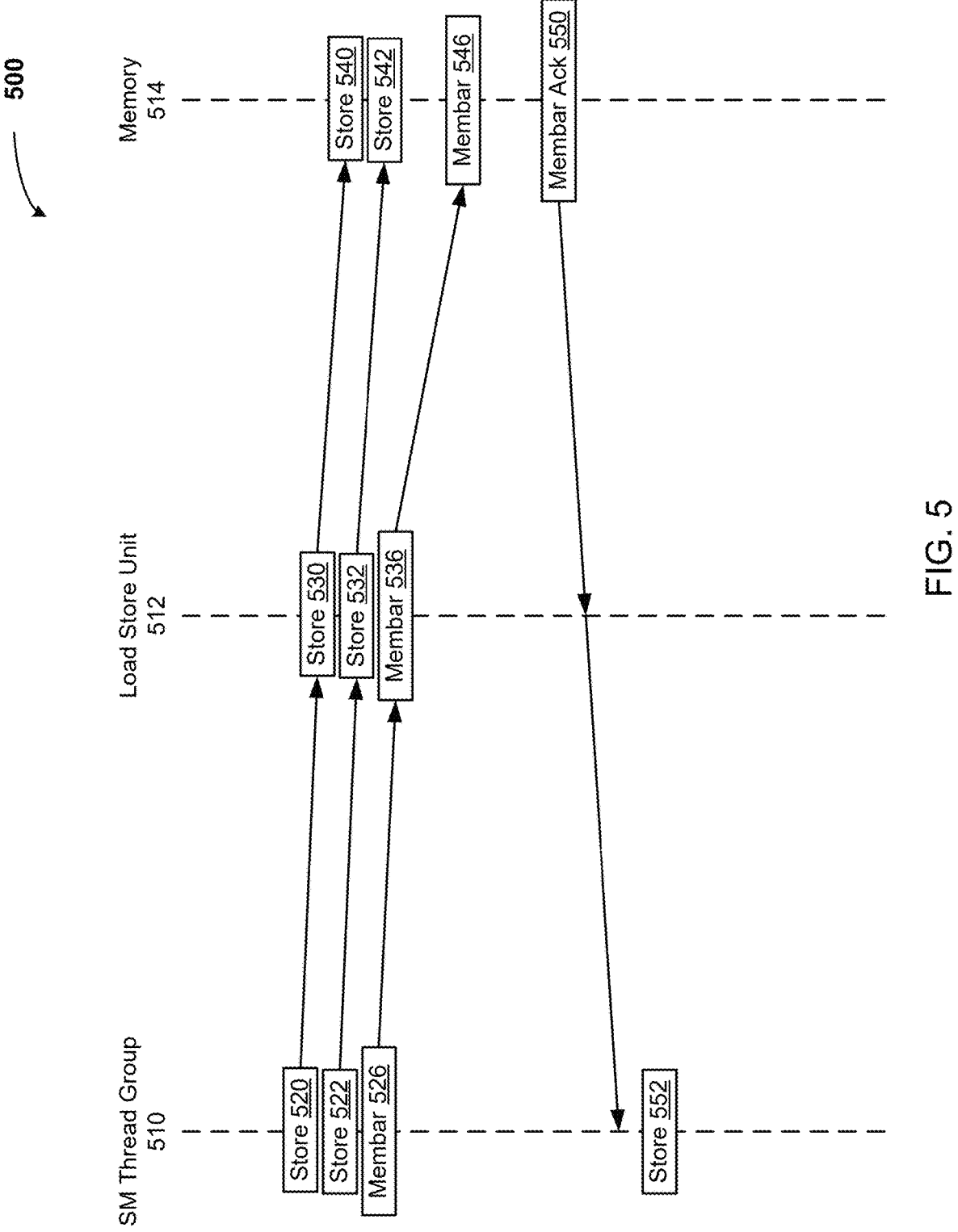
FIG. 5 is a sequence diagram of a memory synchronization operation performed by one or more streaming multiprocessors of FIG. 4, according to various embodiments.

FIG. 5 is a sequence diagram 500 of a memory synchronization operation performed by one or more streaming multiprocessors 310 of FIG. 4, according to various embodiments. As shown, an SM thread group 510 executing on an SM 310 generates two store operations 520 and 522. A load store unit 512 included in a memory subsystem on the SM 310 receives the two store operations, annotated as store operations 530 and 532. The load store unit 512 stores data included in the store operations, annotated as store operations 540 and 542, in memory 514. As shown, store operation 540 completes before store operation 542. Because the SM 310 is part of a relaxed memory model processing unit, store operation 542 can complete before store operation 540. In order to ensure that both store operation 540 and store operation 542 have completed, the SM thread group 510 executes a memory synchronization operation, or memory bar (membar) operation 526 and transmits the memory bar operation 526 to the load store unit 512. The load store unit 512 detects the memory bar operation, annotated as memory bar operation 536. While the memory bar operation, annotated as memory bar operation 546, is pending, the SM thread group 510 cannot execute further load operations or store operations, such as load operations or store operations directed towards memory 514. In some examples, the SM thread group 510 can continue to perform operations other than load operations or store operations. However, if the SM thread group 510 attempts to execute a load operation or a store operation after executing the memory bar operation 526, then the SM thread group 510 stalls until the memory bar operation 526 completes.

The SM thread group 510 remains stalled until store operations 540 and 542, along with any other pending store operations executed by the SM thread group 510 prior to the memory bar operation 526, are visible in memory 514. When the data included in these store operations is visible in memory 514, memory 514 issues a memory bar acknowledgement (membar ack) 550. Memory 514 transmits the memory bar acknowledgement 550 to the SM thread group 510 via the load store unit 512. When the SM thread group 510 receives the memory bar acknowledgement 550, the memory bar operation 526 completes, and the SM thread group 510 resumes execution. The SM thread group 510 executes store operation 552 to write a flag to a specified location, such as a location in memory 514. Upon detecting that the flag has been written, threads included in the SM thread group 510 and/or threads included in other SM thread groups, can reliably read data from memory 514, such as the data stored in memory 514 by store operations 540 and 542.

As discussed herein, the SM thread group 510 stalls while the memory bar operation 526 is pending. In addition, one or more other SM thread groups can exchange data with the SM thread group 510, communicate with the SM thread group 510, and/or the like. Because the SM thread group 510 is stalled, these other thread groups can also stall until the SM thread group 510 resumes execution and exchanges data with and/or communicates with these other thread groups. As a result, stalling of the SM thread group 510 can impact multiple thread groups executing on one or more SMs 310. To alleviate the impact of stalling, the SM thread group 510 can execute an asynchronous release operation rather than a memory bar operation.

Figure 6:
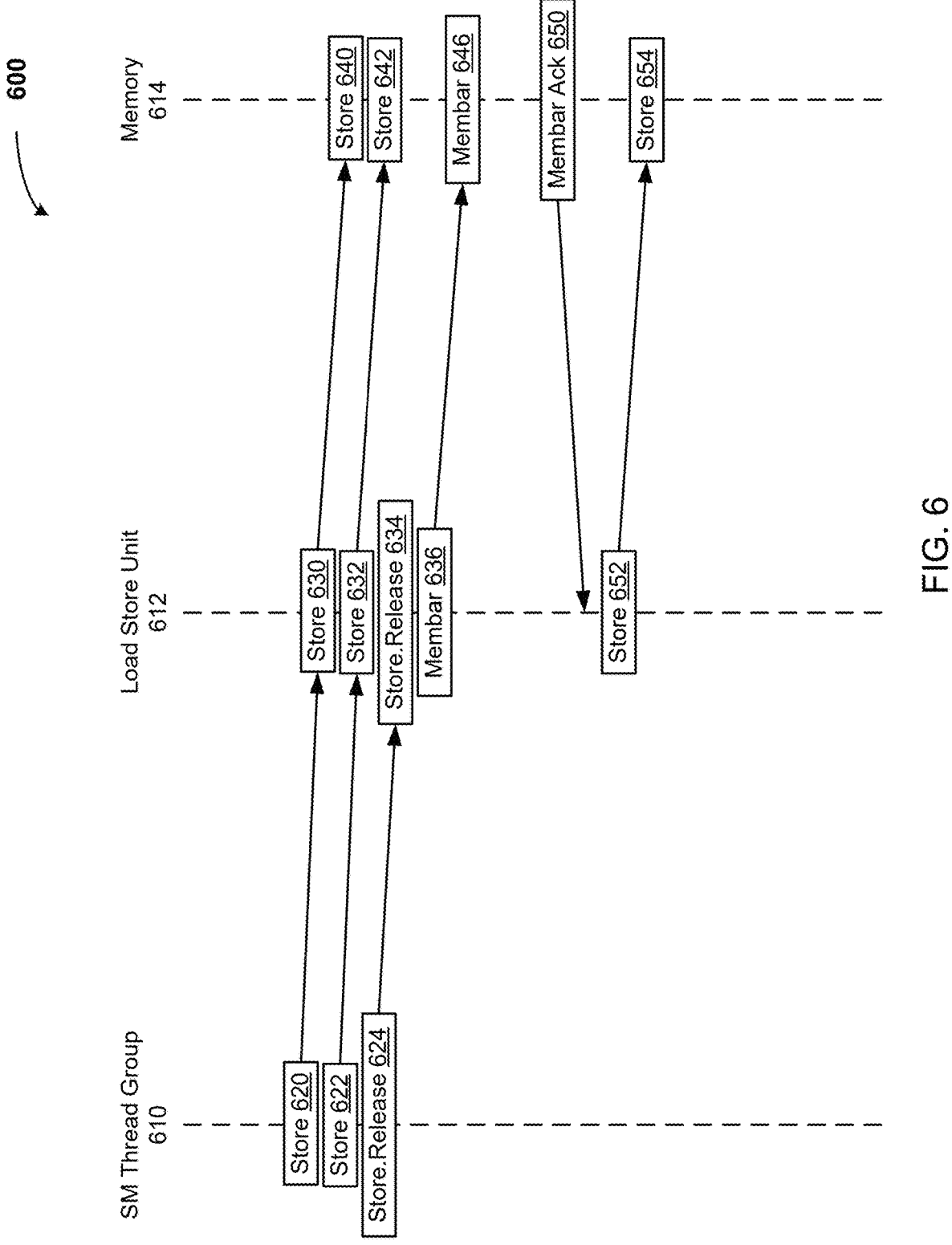
FIG. 6 is a sequence diagram of an asynchronous release operation performed by one or more streaming multiprocessors of FIG. 4, according to various embodiments.

FIG. 6 is a sequence diagram 600 of an asynchronous release operation performed by one or more streaming multiprocessors 310 of FIG. 4, according to various embodiments. As shown, an SM thread group 610 executing on an SM 310 generates two store operations 620 and 622. A load store unit 612 included in a memory subsystem on the SM 310 receives the two store operations, annotated as store operations 630 and 632. The load store unit 612 stores data included in the store operations, annotated as store operations 640 and 642, in memory 614. As shown, store operation 640 completes before store operation 642. Because the SM 310 is part of a relaxed memory model processing unit, store operation 642 can complete before store operation 640. In order to ensure that both store operation 640 and store operation 642 have completed, the SM thread group 610 executes an asynchronous release operation, or store release (store.release) operation 624 and transmits the store release operation 624 to the load store unit 612. The store release operation 624 includes a store operation, such as a standard store instruction, a reduction instruction, an indivisible read-modify write instruction, and/or the like. The store release operation 624 further includes an embedded memory bar operation and a flag store operation that does not stall the issuing SM thread group 610. The load store unit 612 detects the store release operation, annotated as store release operation 634. When the store release operation 634 reaches the load store unit 612, the load store unit 612 expands the store release operation 634 into two operations. The first operation is a memory synchronization operation, or memory bar (membar) operation 636, where the memory bar operation 636 is similar to the memory bar operation 526 of FIG. 5. The second operation is a store operation 652 that is temporarily buffered in the load store unit 612. The load store unit 612 executes the memory bar operation 636. The SM thread group 610 continues to execute instructions and perform further load operations and/or store operations, including load operations and/or store operations directed towards memory 614.

The memory bar operation 646 remains pending at the load store unit 612 until store operations 640 and 642, along with any other pending store operations executed by the SM thread group 610 prior to the store release operation 624, are visible in memory 614. When the data included in these store operations is visible in memory 614, memory 614 issues a memory bar acknowledgement (membar ack) 650. Memory 614 transmits the memory bar acknowledgement 650 to the load store unit 612. When the load store unit 612 receives the memory bar acknowledgement 650, the memory bar operation 636 completes. The load store unit 612 executes store operation 652 to write a flag to a specified location, such as a store operation 654 to write the flag to a location in memory 614. The store operation 654 completes the store release operation 634. Upon detecting that the flag has been written, threads included in the SM thread group 610 and/or threads included in other SM thread groups, can reliably read data from memory 614, such as the data stored in memory 614 by store operations 640 and 642.

The memory bar operation 636 and the store operation 652 are asynchronous with respect to the original store release operation 624. Therefore, the store release operation 624 does not stall the execution of the issuing SM thread group 610. The load store unit 612 ensures that the releasing store operation 652 (e.g., flag write) is visible after the earlier store operations 640 and 642. This process thereby satisfies performance goals in that the issuing SM thread group 610 does not experience loss of throughput associated with directly issuing the memory bar operation. This process further satisfies functional goals in that the load store unit 612 ensures correct synchronization of the data by issuing a memory bar operation 636 and, after receiving the memory bar acknowledgement 650, the store operation 652. Because the SM thread group 610 executed a store release operation 624, the SM thread group 610 does not stall while the memory bar operation 636 is pending, but rather continues executing the threads included in the SM thread group 610. In addition, one or more other SM thread groups can depend on data from the SM thread group 610, transact communications with the SM thread group 610, and/or the like. Because the SM thread group 610 is not stalled, these other thread groups can continue to exchange data with and/or communicate with the SM thread group 610 while the memory bar operation 636 is pending. As a result, executing the store release operation 624 can improve the performance of the SM thread group 610 and/or the performance of other thread groups executing on one or more SMs 310.

FIG. 7 is a flow diagram of method steps for performing asynchronous release operations with the streaming multiprocessors 310 of FIG. 4, according to various embodiments. Additionally or alternatively, the method steps can be performed by one or more alternative auxiliary processors including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-6, persons of ordinary skill in the art will understand that any system configured to perform the method steps, in any order, is within the scope of the present disclosure.

As shown, a method 700 begins at step 702, where a processing unit, such as an SM 310 executing an SM thread group, transmits an asynchronous release operation to an asynchronous release subsystem 400 included in the SM 310. The asynchronous release operation travels through the initial pipeline stages of the asynchronous release subsystem 400, much like any other load operations and/or store operations directed to memory. More specifically, the asynchronous release operation follows the same path of a memory synchronization operation, as the memory synchronization operation passes from the SM 310 and is received by the asynchronous release subsystem 400 associated with the SM 310.

At step 704, the asynchronous release subsystem 400 detects the asynchronous release operation and triggers a release memory bar coalescer 422 included in the asynchronous release subsystem 400. Upon detecting the asynchronous release operation, the asynchronous release subsystem 400 performs two operations in parallel: (1) the asynchronous release subsystem 400 triggers the release memory bar coalescer 422 (if the release memory bar coalescer 422 has not been previously triggered); and (2) the release memory bar coalescer 422 inserts a store operation to write a flag associated with the asynchronous release operation into a release queue 430. The store operation to write the flag signifies that the asynchronous release operation is complete and, therefore, released. Once the flag store operation completes, other threads that consume the data associated with the asynchronous release operation can detect the flag and reliably access the data. The release queue 430 buffers the relevant data to carry out the flag store operation, including instruction metadata, the virtual address, the write data, and/or the like. The release queue 430 is partitioned to support multiple memory bar phases. In some examples, the release queue 430 is partitioned to support two memory bar phases. In such cases, the asynchronous release subsystem 400 collects data associated with a first set of flag store operations into a first buffer in the release queue 430. This buffer is referred to as a background buffer. In parallel, the asynchronous release subsystem 400 processes, or drains, data associated with a second set of flag store operations that were previously collected into the second buffer in the release queue 430. This second buffer is referred to as the current buffer. The ordered nature of the release queue 430 ensures that the order of the flag store operations stored therein is preserved, thereby preserving the same memory address ordering as the original store operations generated by the SM 310.

At step 706, the release memory bar coalescer 422 coalesces pending flag store operations to the same memory address into a single flag store operation. In so doing, the release memory bar coalescer 422 attempts to identify other pending flag store operations to the same memory address and to coalesce these flag store operations to the same memory address into a single flag store operation. Coalescing such flag store operations into a single flag store operation can reduce the number of flag store operations pending in the release queue 430 for a particular memory address. As a result, the memory of the release queue 430 is utilized with greater efficiency, and the total number of pending flag store operations can exceed the total number of entries in the release queue 430.

At step 708, the release memory bar coalescer 422 coalesces pending flag store operations to adjacent memory addresses into a single request. In so doing, the release memory bar coalescer 422 attempts to identify other pending flag store operations to adjacent memory addresses and to coalesce these flag store operations to a single flag store operation representing a larger data block than each of the original flag store operations. Coalescing such flag store operations for smaller data blocks into a single flag store operation for a larger data block can reduce the number of flag store operations pending in the release queue 430 for a particular set of memory addresses. As a result, the memory of the release queue 430 is utilized with greater efficiency, and the total number of pending flag store operations can exceed the total number of entries in the release queue 430.

In some examples, to perform the coalescing operations of step 706 and/or step 708, the release memory bar coalescer 422 initializes a counter to a first predefined value. The release memory bar coalescer 422 periodically increments or decrements the counter to a second predefined value, where the difference between the first predefined value and the second predefined value represents a duration of time. In some examples, the release memory bar coalescer 422 can initialize the counter to a maximum counter value and can decrement the counter until the counter reaches zero. In some examples, the release memory bar coalescer 422 can initialize the counter to zero and can increment the counter until the counter reaches a maximum counter value. The release memory bar coalescer 422 coalesces flag store operations while the counter is still counting and has not yet reached the second predefined value. When the counter reaches the second predefined value, the release memory bar coalescer 422 ceases to coalesce flag store operations and forwards the flag store operations to release queue 430.

At step 710, release data coalescer 424 inserts the flag store operation into release queue 430. Subsequently, the flag store operation is drained from release queue 430. In this manner, release data coalescer 424 optimizes flag store operation to better utilize the memory space in release queue 430.

At step 712, the release memory bar coalescer 422 drains the release queue of flag store operations. When data associated with a store release operation is visible in memory, the release memory bar coalescer 422 receives a memory bar acknowledgement. Upon receiving the memory bar acknowledgement, a drain unit 440 included in the asynchronous release subsystem 400 begins to process the entries for the flag store operations in the release queue 430, thereby draining the release queue 430 of flag store operations. As each entry is drained from the release queue 430, the release memory bar coalescer 422 forwards the corresponding flag store operation to system memory 104, PP memory 204, memory mapped I/O devices, the memory subsystem via the on-chip network 450 and/or other suitable interface.

At step 714, the release memory bar coalescer 422 switches the release queue 430 to a different memory bar phase. While the drain unit 440 is draining the current buffer of the release queue 430 of flag store operations, the release memory bar coalescer 422 continues to collect further flag store operations in one or more other background buffers of the release queue 430. Each buffer of the release queue 430 corresponds to a different memory bar phase of the release queue 430. When the current buffer, for the current memory bar phase, is drained of write store operations, the release memory bar coalescer 422 switches the memory bar phase of the release queue 430 such that one of the background buffers becomes the current buffer, and the formerly current buffer becomes a background buffer. In the new memory bar phase, the release memory bar coalescer 422 drains the newly current buffer of flag store operations while the formerly current buffer collects further flag store operations for a subsequent memory bar phase of the release queue 430. The method 700 then proceeds to step 702, described above, to process additional asynchronous release operations.

In sum, threads synchronize data being transferred to one or more other threads by writing the data to memory with a series of memory operations and executing an asynchronous release operation. The asynchronous release operation is a store operation with a built-in memory synchronization operation that does not stall the issuing thread for the duration of the memory synchronization operation. Instead, a load store unit receives the asynchronous release operation and enqueues the flag store operation into a release queue, and allows the issuing thread to proceed with normal execution. Memory barrier logic executes the memory synchronization operation. When the memory synchronization operation completes, the memory barrier logic signals the completion of the memory synchronization operation to the release queue. At this point, the earlier memory operations are visible to the receiving thread, and the release queue can perform the flag store operation.

At least one technical advantage of the disclosed techniques relative to the prior art is that, with the disclosed techniques, a thread that issues an asynchronous release operation does not stall pending completion of a memory synchronization operation. Instead, after issuing the asynchronous release operation, the thread can execute further operations without waiting for data associated with the asynchronous release operation to be visible to the receiving thread(s). As a result, the issuing thread executes with increased performance relative to prior techniques. Further, because multiple asynchronous release operations can be coalesced to a single memory synchronization operation, fewer asynchronous release operations are issued, further improving performance. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transferring data between threads executing in a multiprocessor computing system, the method comprising:

receiving a first store operation from a first processing unit that includes a first memory synchronization operation and a first flag operation; and storing a first entry corresponding to the first flag operation in a side structure, wherein the first flag operation is executed to indicate that data associated with a second store operation is visible in a memory, wherein the second store operation is generated by the first processing unit prior to generating the first store operation, wherein a device executes the first memory synchronization operation, and wherein the first processing unit continues to execute one or more operations while the first memory synchronization operation is pending.

2. The computer-implemented method of claim 1, wherein the first store operation, the first memory synchronization operation, or the first flag operation is issued via processor instructions executed by the first processing unit.

3. The computer-implemented method of claim 1, further comprising:

determining that the data associated with the second store operation is visible in the memory; and executing the first flag operation.

4. The computer-implemented method of claim 3, wherein the device:

determines that the first flag operation has executed; and in response, accesses the data associated with the second store operation.

5. The computer-implemented method of claim 4, wherein the device is a second processing unit or a peripheral device.

6. The computer-implemented method of claim 3, further comprising removing the first entry from the side structure.

7. The computer-implemented method of claim 3, wherein the first entry is stored in a first buffer included in the side structure, and further comprising:

receiving a third store operation from the first processing unit that includes a second memory synchronization operation and a second flag operation; and storing a second entry corresponding to the second flag operation in a second buffer included in the side structure.

8. The computer-implemented method of claim 1, further comprising:

determining that data associated with a third store operation is visible in the memory, wherein the third store operation is generated by the first processing unit prior to generating the first store operation;

determining that data associated with a fourth store operation is visible in the memory, wherein the fourth store operation is generated by the first processing unit prior to generating the third store operation; and executing the first flag operation, wherein the data associated with the third store operation is visible in the memory before the data associated with the fourth store operation is visible in the memory.

9. The computer-implemented method of claim 1, further comprising:

receiving a third store operation from the first processing unit that includes a second memory synchronization operation and a second flag operation;

determining that the second flag operation is directed to a first memory address and the first flag operation is directed to the first memory address;

generating a second entry corresponding to the first flag operation and the second flag operation; and storing the second entry in the side structure in place of the first entry.

10. The computer-implemented method of claim 1, further comprising:

receiving a third store operation from the first processing unit that includes a second memory synchronization operation and a second flag operation;

determining that the second flag operation is directed to a first memory address that is adjacent to a second memory address of the first flag operation;

generating a second entry corresponding to the first flag operation and the second flag operation; and storing the second entry in the side structure in place of the first entry.

11. The computer-implemented method of claim 10, wherein the second memory address of the first flag operation is within a first portion of a memory address range, the first memory address of the second flag operation is within a second portion of the memory address range, and the first portion of the memory address range overlaps the second portion of the memory address range.

12. The computer-implemented method of claim 1, further comprising:

receiving a query operation from the first processing unit that requests a status of the first store operation;

determining that the first flag operation is complete and has been flushed from the side structure; and transmitting a status message to the first processing unit indicating that the first store operation is complete.

13. The computer-implemented method of claim 1, wherein the first entry includes one or more of metadata associated with the first flag operation, a virtual address associated with the first flag operation, and data associated with the first flag operation.

14. A system comprising:

a first processing unit that:

generates a first store operation that includes a first memory synchronization operation and a first flag operation;

a memory synchronization subsystem that:

receives the first store operation from the first processing unit, and stores a first entry associated with the first flag operation in a side structure, wherein the first flag operation is executed to indicate that data associated with a second store operation is visible in a memory, wherein the second store operation is generated by the first processing unit prior to generating the first store operation; and a device that:

executes the first memory synchronization operation, wherein the first processing unit continues to execute one or more operations while the first memory synchronization operation is pending.

15. The system of claim 14, wherein the memory synchronization subsystem further:

determines that the data associated with the second store operation is visible in the memory; and executes the first flag operation.

16. The system of claim 15, wherein the device further:

determines that the first flag operation has executed; and in response, accesses the data associated with the second store operation.

17. The system of claim 15, wherein the first entry is stored in a first buffer included in the side structure, and wherein the memory synchronization subsystem further:

receives a third store operation from the first processing unit that includes a second memory synchronization operation and a second flag operation; and stores a second entry corresponding to the second flag operation in a second buffer included in the side structure.

18. The system of claim 14, wherein the memory synchronization subsystem further:

determines that data associated with a third store operation is visible in the memory, wherein the third store operation is generated by the first processing unit prior to generating the first store operation;

determines that data associated with a fourth store operation is visible in the memory, wherein the fourth store operation is generated by the first processing unit prior to generating the third store operation; and executes the first flag operation, wherein the data associated with the third store operation is visible in the memory before the data associated with the fourth store operation is visible in the memory.

19. The system of claim 14, wherein the memory synchronization subsystem further:

receives a third store operation from the first processing unit that includes a second memory synchronization operation and a second flag operation;

determines that the second flag operation is directed to a first memory address and the first flag operation is directed to the first memory address;

generates a second entry corresponding to the first flag operation and the second flag operation; and stores the second entry in the side structure in place of the first entry.

20. The system of claim 14, wherein the memory synchronization subsystem further:

receives a third store operation from the first processing unit that includes a second memory synchronization operation and a second flag operation;

determines that the second flag operation is directed to a first memory address that is adjacent to a second memory address of the first flag operation;

generates a second entry corresponding to the first flag operation and the second flag operation; and stores the second entry in the side structure in place of the first entry, wherein the second memory address of the first flag operation is within a first portion of a memory address range, the first memory address of the second flag operation is within a second portion of the memory address range, and the first portion of the memory address range overlaps the second portion of the memory address range.

* * * * *